United States Patent
Tiwari

(10) Patent No.: US 10,291,876 B2
(45) Date of Patent: *May 14, 2019

(54) METHOD OF POWER SIGNAL DETECTION FOR SET TOP BOX DEVICES

(71) Applicant: Contec, LLC, Schenectady, NY (US)

(72) Inventor: Rajeev Tiwari, Sunnyvale, CA (US)

(73) Assignee: Contec, LLC, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/881,333

(22) Filed: Jan. 26, 2018

(65) Prior Publication Data

US 2018/0152661 A1    May 31, 2018

Related U.S. Application Data

(63) Continuation of application No. 15/170,775, filed on Jun. 1, 2016, now Pat. No. 9,900,545.

(51) Int. Cl.
*H04N 5/63* (2006.01)
*H04N 17/00* (2006.01)
*H04N 21/443* (2011.01)

(52) U.S. Cl.
CPC ............ *H04N 5/63* (2013.01); *H04N 17/004* (2013.01); *H04N 21/443* (2013.01); *H04N 21/4436* (2013.01)

(58) Field of Classification Search
CPC .............................. H04N 5/63; H04N 17/004
USPC ....................................... 348/730, 180, 187
See application file for complete search history.

(56) References Cited

U.S. PATENT DOCUMENTS

| | | | |
|---|---|---|---|
| 4,222,068 A | 9/1980 | Thompson | |
| 5,047,860 A | 9/1991 | Rogalski | |
| 5,371,550 A | 12/1994 | Shibutani | |
| 5,524,281 A | 6/1996 | Bradley | |
| 5,631,714 A | 5/1997 | Saadoun | |
| 5,748,259 A | 5/1998 | Kang | |
| 6,271,879 B1 | 8/2001 | Overton | |
| 7,664,317 B1 | 2/2010 | Sowerby | |
| 7,817,184 B1 | 10/2010 | Michener | |
| 8,418,219 B1* | 4/2013 | Parsons | H04N 17/004 348/180 |
| 8,782,727 B1 | 7/2014 | Nagarajan | |
| 9,900,545 B2 | 2/2018 | Tiwari | |
| 2005/0179818 A1 | 8/2005 | Wong | |
| 2006/0044468 A1 | 3/2006 | Chowdhury | |
| 2011/0109809 A1* | 5/2011 | Dai | H04N 5/44 348/730 |
| 2016/0344457 A1* | 11/2016 | Olsson | H04B 7/0413 |
| 2017/0353690 A1* | 12/2017 | Tiwari | H04N 5/63 |

OTHER PUBLICATIONS

Tiwari, Rajeev; Final Office Action for U.S. Appl. No. 15/170,775, filed Jun. 1, 2016, dated May 26, 2017, 10 pgs.

(Continued)

*Primary Examiner* — Paulos M Natnael
(74) *Attorney, Agent, or Firm* — Taylor English Duma LLP

(57) ABSTRACT

A method of power signal detection of set top boxes under test is disclosed. According to certain embodiments, detection of a failure mode of a set top box (STB) under test is based on video signal detection where the video signal is associated with multiple video output types and AC power outlet signal detection.

18 Claims, 1 Drawing Sheet

(56) References Cited

OTHER PUBLICATIONS

Tiwari, Rajeev; Issue Notification for U.S. Appl. No. 15/170,775, filed Jun. 1, 2016, dated Jan. 31, 2018, 1 pg.
Tiwari, Rajeev; Non-Final Office Action for U.S. Appl. No. 15/170,775, filed Jun. 1, 2016, dated Jan. 17, 2017, 7 pgs.
Tiwari, Rajeev; Notice of Allowance for U.S. Appl. No. 15/170,775, filed Jun. 1, 2016, dated Oct. 6, 2017, 13 pgs.
Businesswire; Article entitled: "GENBAND and CTDI Settle Legal Dispute", located at <http://www.businesswire.com/news/home/20140321005528/en/GENBAND-CTDI-Settle-Legal-Dispute>, Mar. 21, 2014, 1 pg.
CED Magazine; Article entitled: "Cable Connects in Atlanta", located at <https://www.cedmagazine.com/article/2006/04/Gable-connects-atlanta>, Apr. 30, 2006, 21 pgs.
Consumer Electronics Net; Article entitled: "Teleplan Enhances Test Solution Portfolio with Titan", located at <http://www.consumerelectronicsnet.com/article/Teleplan-Enhances-Test-Solution-Portfolio-With-Titan-4673561>, published on Nov. 1, 2016, 3 pgs.
Digital Producer; Article entitled: "S3 Group Unveils Exclusive Partnership in North America With First US StormTest(TM) Decision Line Customer", located at <http://www.digitalproduce.com/article/S3-Group-Unveils-Exclusive-Partnership-in-North-America-With-First-US-StormTest(TM)-Decision-Line-Customer--1668213>, Sep. 8, 2011, 3 pgs.
Electronic Design; Article entitled: "Testing of MPEG-2 Set-Top Boxes Must be Fast, Thorough", located at <http://www.electronicdesign.com/print/839>, published Nov. 18, 2001, 9 pgs.
Euromedia; Article entitled: "Automated TV Client testing: Swisscom partners with S3 Group to deliver the ultimate IPTV experience", located at <http://advanced-television.com/wp-content/uploads/2012/10/s3.pdf>, earliest known pub. date—May 30, 2013, 2 pgs.
Exact Ventures; Report entitled: North American Telecommunications Equipment Repair Market, located at http://www.fortsol.com/wp-content/uploads/2016/08/Exact-Ventures-NA-Repair-Market-Report.pdf>, earliest known publication date Aug. 1, 2016, 12 pgs.
Promptlink Communications; Article entitled: "Promptlink Communications Officially Launches Sep-Top Box Testing Platform", located at <https://www.promptlink.com/company/assets/media/2014-05-20.pdf>, published on May 20, 2014, 2 pgs.
Promptlink; Article entitled: "Cable Modem Test Platform", located at <https://www.promptlink.com/products/cmtp.html>, earliest known publication date Aug. 11, 2016, 10 pgs.
Promptlink; Article entitled: "Set-Top Box Test Platform", located at <http://promptlink.com/products/stbtp.html>, earliest known publication date Aug. 11, 2016, 7 pgs.
S3 Group; Document entitled: "White Paper: The Importance of Automated Testing in Set-Top Box Integration", earliest known publication date Jun. 17, 2014, 11 pgs.
Teleplan; Article entitled: "Screening & Testing", located at <https://www.teleplan.com/innovative-services/screening-testing/>, earliest known publication date Mar. 21, 2015, 7 pgs.
TVTechnology; Article entitled: "S3 Group's StormTest", located at <http://www.tvtechnology.com/expertise/0003/s3-groups-stormtest/256690>, published May 1, 2012, 2 pgs.

\* cited by examiner

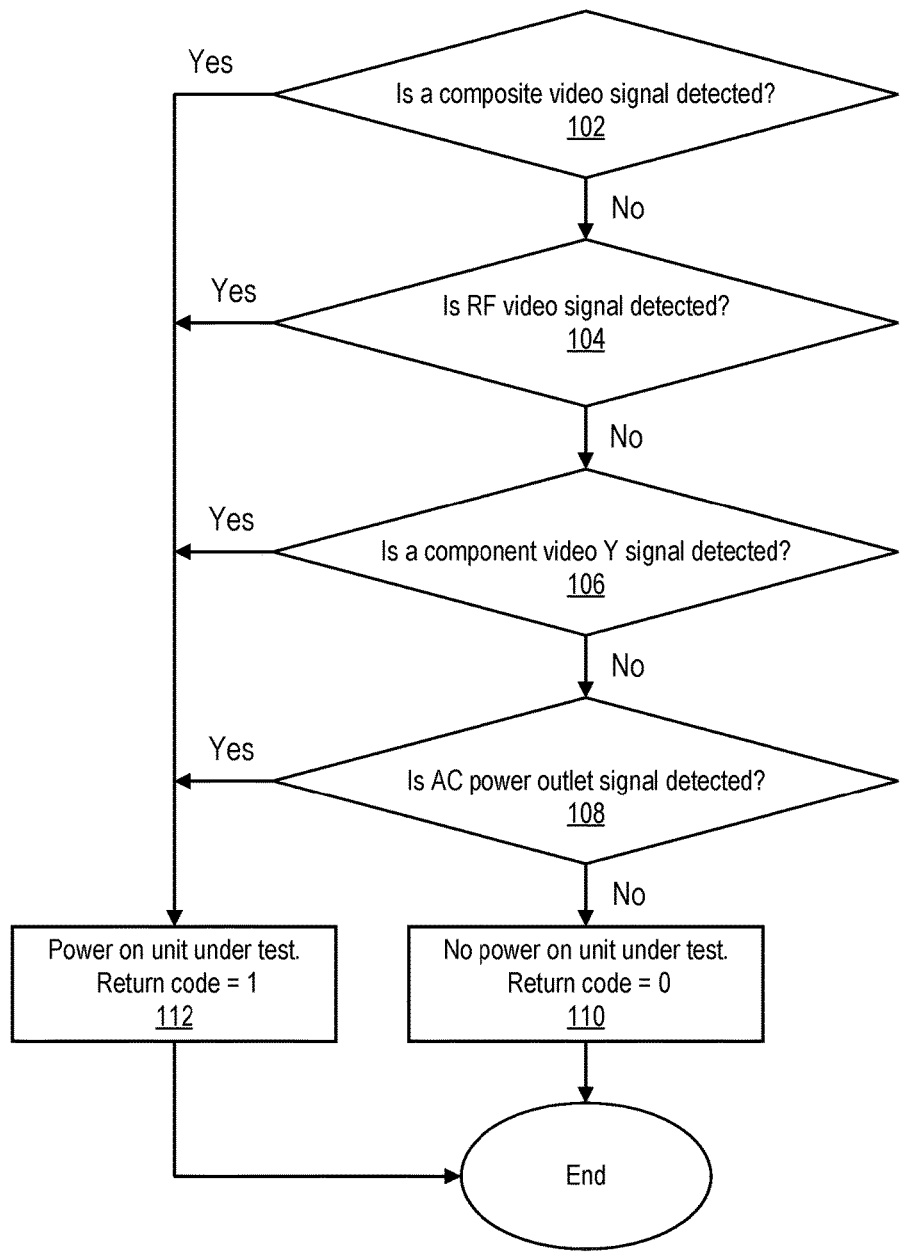

METHOD OF POWER SIGNAL DETECTION FOR SET TOP BOX DEVICES

CROSS-REFERENCE TO RELATED APPLICATIONS

This application is a continuation of U.S. patent application Ser. No. 15/170,775, filed Jun. 1, 2016, and hereby incorporated in its entirety by reference.

TECHNICAL FIELD

The present invention is directed to a system for testing set top boxes.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 1 illustrates a high-level method of testing an STB unit under test after powering on the STB unit under test, according to certain embodiments.

DETAILED DESCRIPTION

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, detection of a failure mode of a set top box (STB) under test is based on video signal detection where the video signal is associated with multiple video output types and AC power outlet signal detection.

According to certain embodiments, when testing an STB unit for failure mode (e.g., no power-on or dead unit), the detection of the existence of video output signals and AC power outlet signal follow the following order on the STB unit under test: composite video signal, radio frequency (RF) video signal (on channel 3 and channel 4 for North American STB devices, and on other relevant channels for STB devices for other countries), component video Y signal, and AC power outlet signal.

FIG. 1 illustrates a high-level method of testing an STB unit under test after powering on the STB unit under test, according to certain embodiments. At block 102, it is determined if a composite video signal associated with the STB unit under test is detected. If a composite video signal associated with the STB unit under test is detected at block 102, then at block 112, the return code is set to 1 to indicate that the STB unit under test has power on.

If a composite video signal associated with the STB unit under test is not detected at block 102, then at block 104, it is determined if an RF video signal associated with the STB unit under test is detected.

If an RF video signal associated with the STB unit under test is detected at block 104, then at block 112, the return code is set to 1 to indicate that the STB unit under test has power on.

If an RF video signal associated with the STB unit under test is not detected at block 104, then at block 106, it is determined if a component video Y signal associated with the STB unit under test is detected.

If a component video Y signal associated with the STB unit under test is detected at block 106, then at block 112, the return code is set to 1 to indicate that the STB unit under test has power on.

If a component video Y signal associated with the STB unit under test is not detected at block 106, then at block 108, it is determined if an AC power outlet signal associated with the STB unit under test is detected.

If an AC power outlet signal associated with the STB unit under test is detected at block 108, then at block 112, the return code is set to 1 to indicate that the STB unit under test has power on.

If an AC power outlet signal associated with is not detected at block 108, then at block 110, the return code is set to 0 to indicate that the STB unit under test has no power.

According to certain embodiments, one or more composite video detection circuits or devices are used for detecting a composite video signals in the STB unit under test. Similarly, one or more RF video detection circuits or devices are used for detecting RF video signals in the STB unit under test. One or more component video Y detection circuits or devices are used for detecting component video Y signals in the STB unit under test. One or more AC power outlet detection circuits or devices are used for detecting AC power outlet signals in the STB unit under test.

According to certain embodiments, the test station is configured to test multiple STB units at the same time. Such a test station is flexible in that it can also test a single STB unit, if no other STB units are scheduled for testing.

In the foregoing specification, embodiments of the invention have been described with reference to numerous specific details that may vary from implementation to implementation. The specification and drawings are, accordingly, to be regarded in an illustrative rather than a restrictive sense.

I claim:

1. A method of detecting power signals of a device under test, the method comprising:
   using a plurality of video detection circuits in a predetermined order to determine whether one of a plurality of different types of video signals associated with a device under test is detected; and
   responsive to detecting at least one of the plurality of different types of video signals associated with the device under test, indicating that the device under test has power on;
   responsive to a lack of detection of any of the plurality of different types of video signals associated with the device under test, using an AC power outlet detection circuit to determine whether an AC power outlet signal associated with the device under test is detected;

responsive to detecting the AC power outlet signal by the AC power outlet detection circuit, indicating that the device under test has power on; and responsive to a lack of detection of the AC power outlet signal by the AC power outlet detection circuit, indicating that the device under test has no power.

2. The method of claim 1, wherein each detection circuit is a dedicated circuit configured to detect one type of the plurality of different types of video signals.

3. The method of claim 2, wherein the plurality of different types of video signals comprises composite video signals, RF video signals, and component video Y signals, and wherein the video detection circuits comprise:
   a composite video detection circuit;
   an RF video detection circuit; and
   a component video Y detection circuit.

4. The method of claim 1, wherein the video detection circuits and the AC power outlet detection circuit support simultaneous testing of multiple devices under test.

5. The method of claim 4, wherein the device under test is one of a plurality of devices being simultaneously tested.

6. The method of claim 1, wherein the device under test comprises a set top box.

7. The method of claim 1, further comprising applying power to the device under test before using any detection circuit.

8. The method of claim 1, wherein the video detection circuits are used in the following order:
   a composite video signal;
   an RF video signal; and
   a component video Y signal.

9. The method of claim 1, wherein indicating that the device under test has no power comprises setting a return code.

10. The method of claim 1, wherein indicating that the device has power on comprises setting a return code.

11. A system for testing video devices, comprising:
   at least one video detection circuit configured to determine whether at least one of a plurality of different types of video signals associated with a video device under test is detected;
   an AC power outlet detection circuit configured to determine whether an AC power outlet signal associated with the video device under test is detected; and
   a return code configured to indicate whether the video device under test has power on or is in failure mode;

wherein
   the AC power outlet detection circuit is further configured for detection of an AC power outlet signal if the at least one video detection circuit does not detect a video signal associated with the video device under test;
   the return code is further configured to indicate that the video device under test has power on if the at least one video detection circuit detects at least one of the plurality of different types of video signals associated with the video device under test or if the AC power outlet detection circuit detects an AC power outlet signal associated with the video device under test; and
   the return code is further configured to indicate that the video device under test is in failure mode if the AC power outlet detection circuit does not detect an AC power outlet signal associated with the video device under test.

12. The system of claim 11, wherein the at least one video detection circuit is a dedicated circuit configured to detect one type of the plurality of different types of video signals associated with the video device under test.

13. The system of claim 12, wherein the plurality of different types of video signals comprises composite video signals, RF video signals, and component video Y signals, and wherein the at least one video detection circuit comprises:
   a composite video detection circuit;
   an RF video detection circuit; and
   a component video Y detection circuit.

14. The system of claim 13, wherein the at least one video detection circuits are used in the following order:
   the composite video detection circuit;
   the RF video detection circuit; and
   the component video Y detection circuit.

15. The system of claim 11, wherein the at least one video detection circuit and the AC power outlet detection circuit support simultaneous testing of multiple video devices.

16. The system of claim 11, wherein the video device under test is one of a plurality of video devices being simultaneously tested.

17. The system of claim 11, wherein the video device under test comprises a set top box.

18. The system of claim 11, further comprising circuitry configured to perform functional testing on the video device under test if the video device under test has power on.

* * * * *